June 10, 1930.  C. N. NEKLUTIN  1,762,344
STRIP MACHINE
Filed Aug. 31, 1927    9 Sheets-Sheet 3
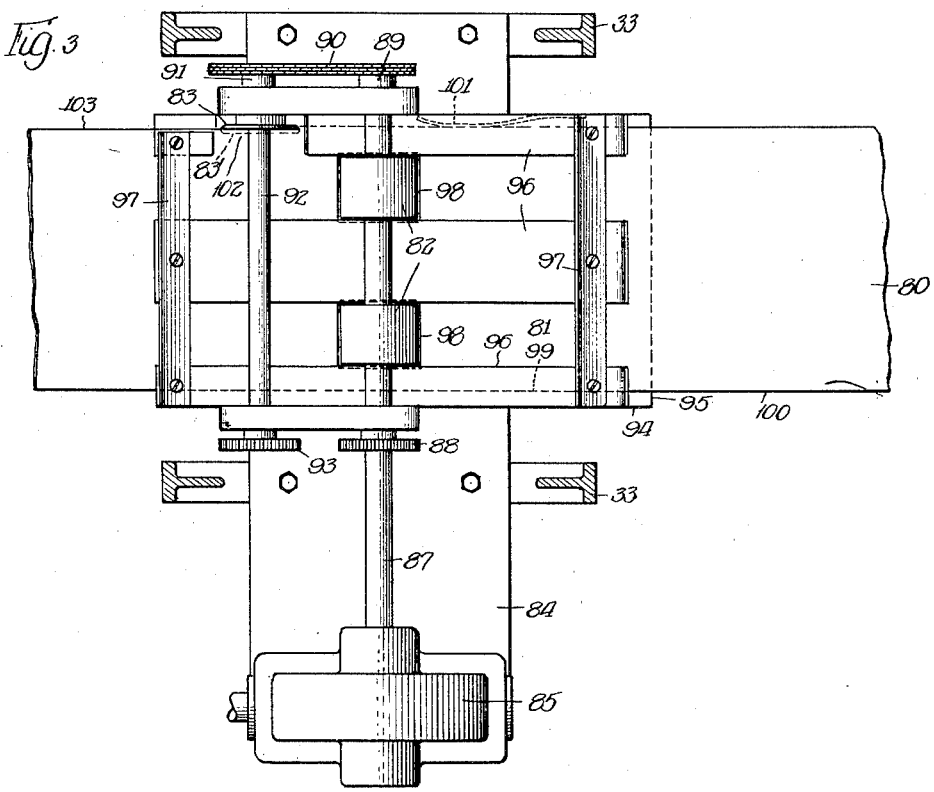
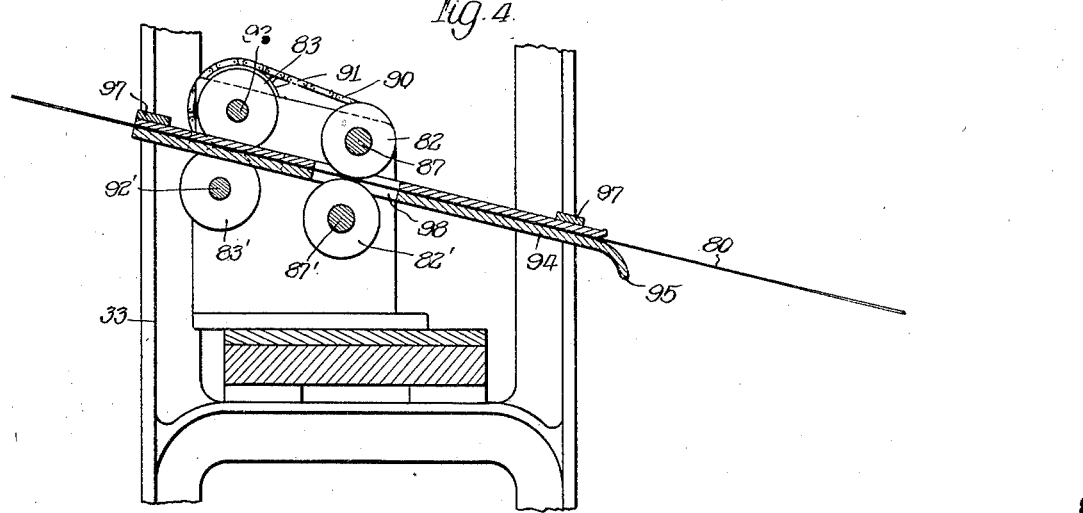
Witness:
R. Burkhardt
Inventor:
Constantine N. Neklutin,
By Wilkinson, Huxley, Byron, & Knight Attys.

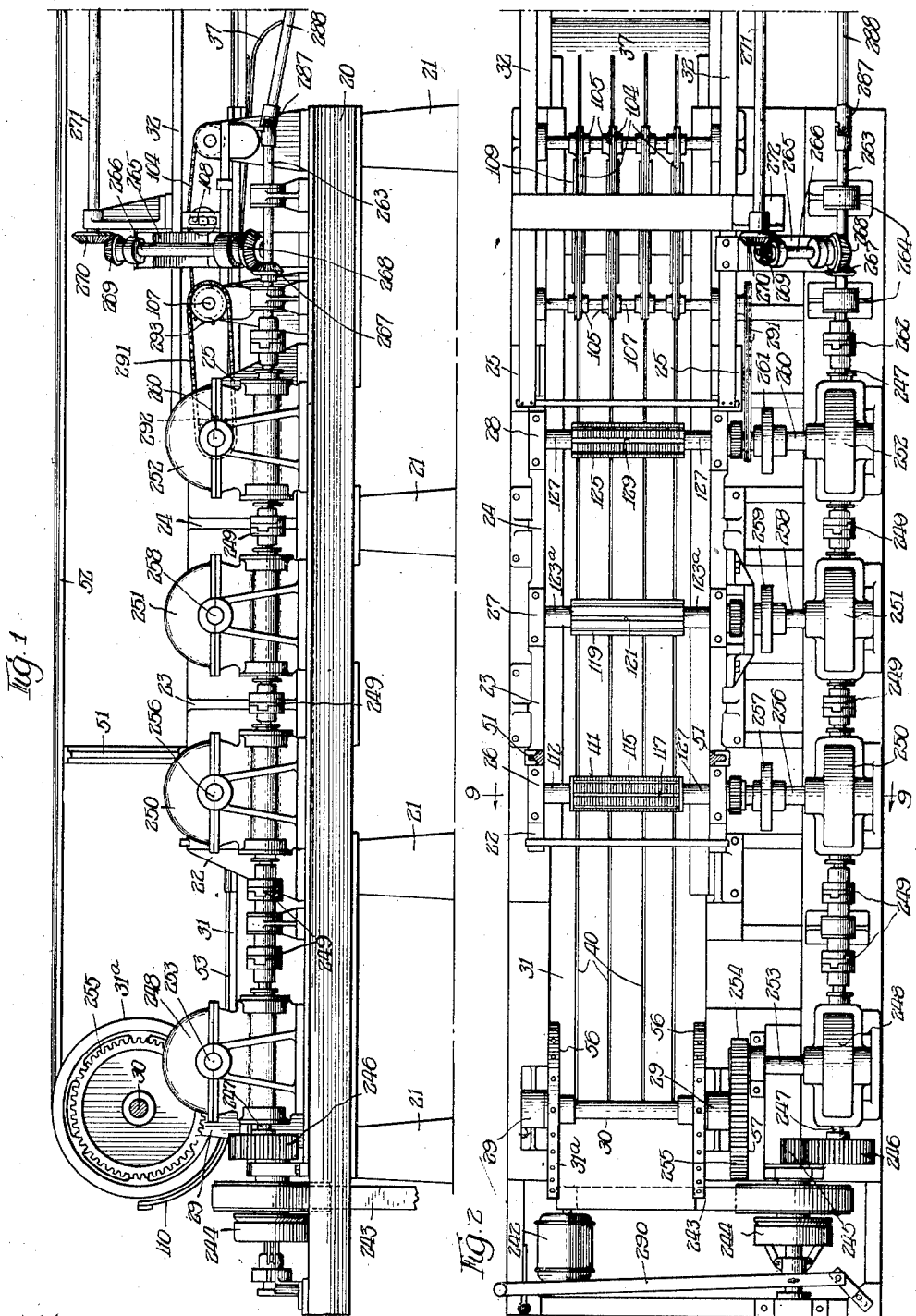

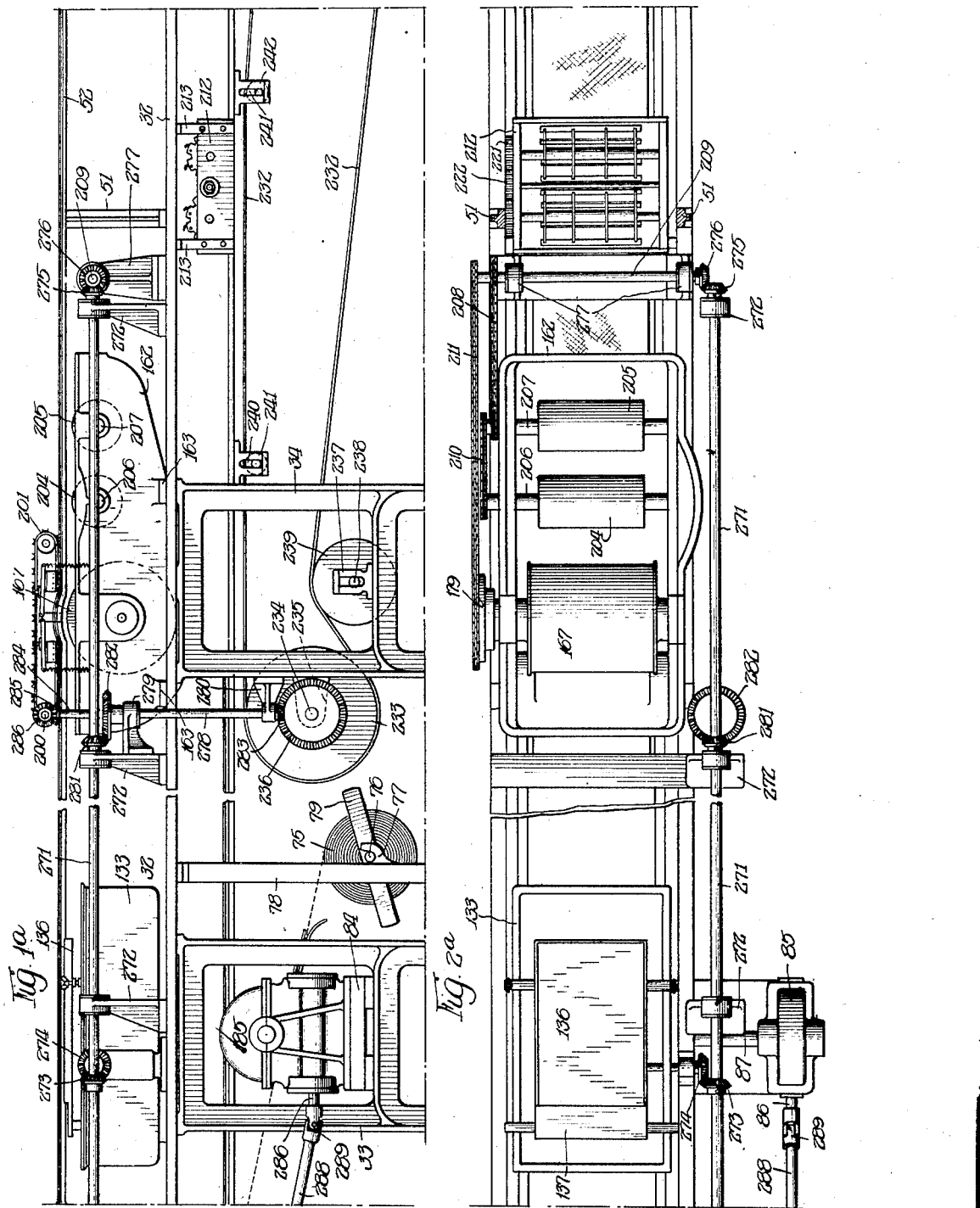

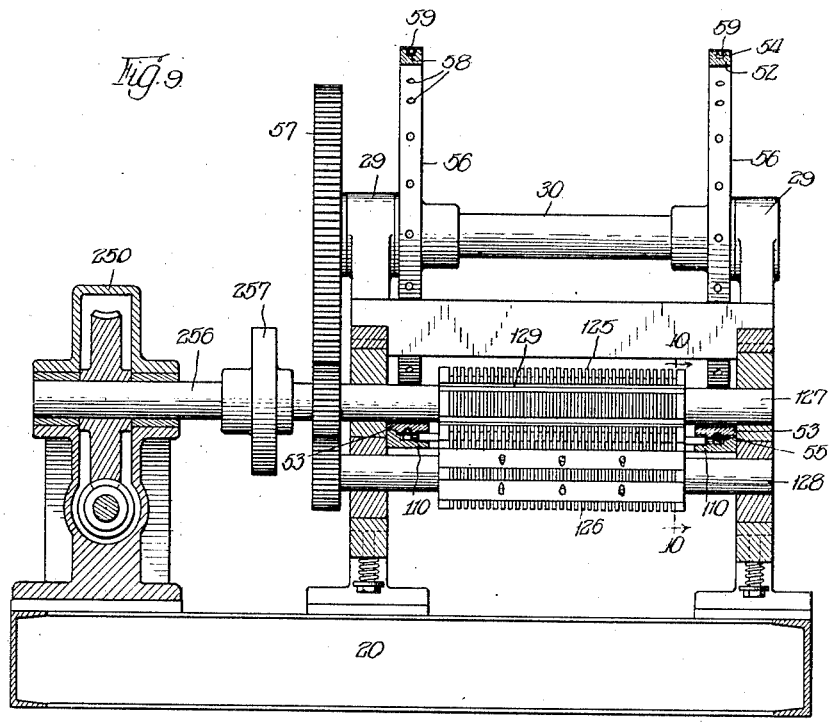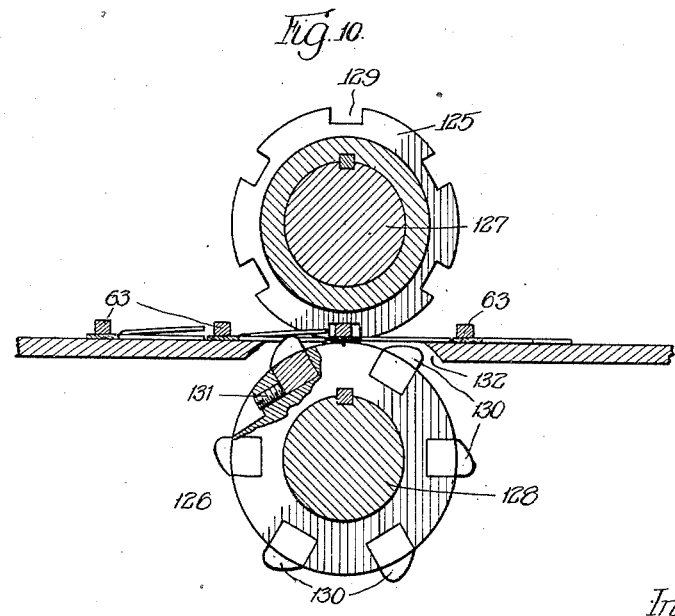

June 10, 1930.  C. N. NEKLUTIN  1,762,344
STRIP MACHINE
Filed Aug. 31, 1927    9 Sheets-Sheet 6
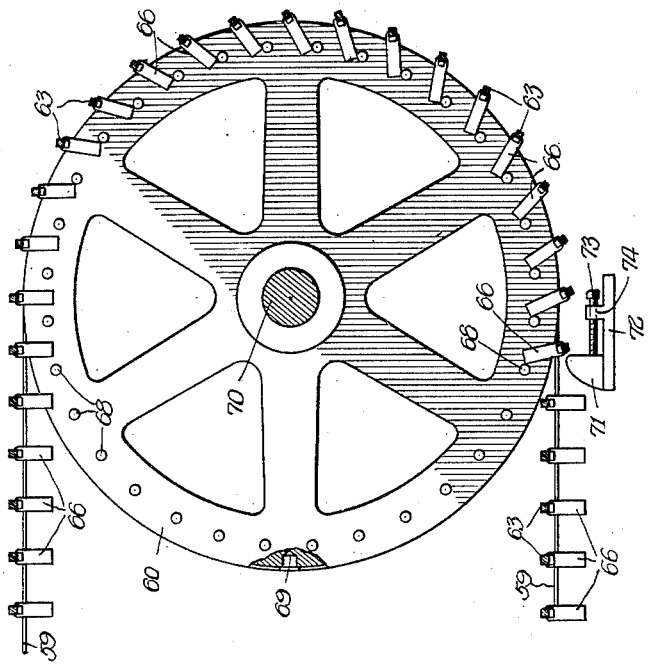
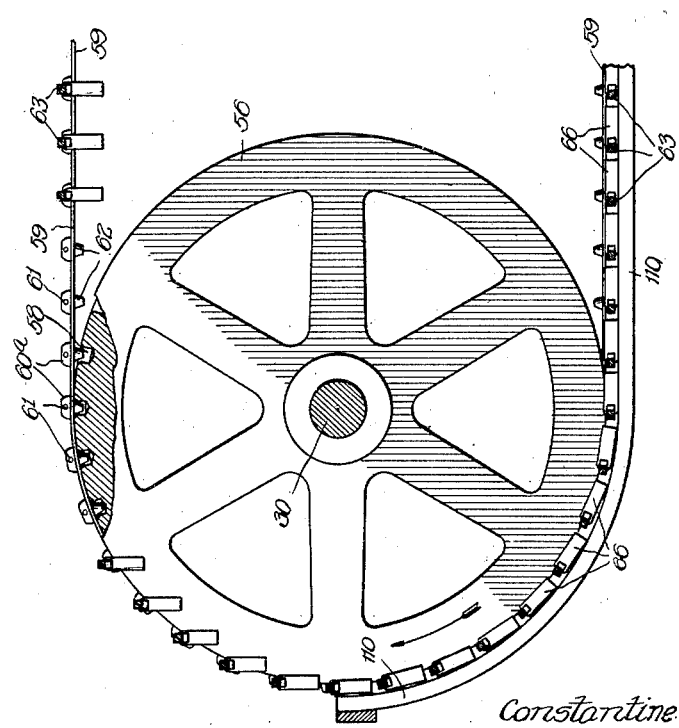
Witness:
A. Burkhardt.
Inventor:
Constantine N. Neklutin
By Wilkinson, Huxley, Byron, & Knight attys.

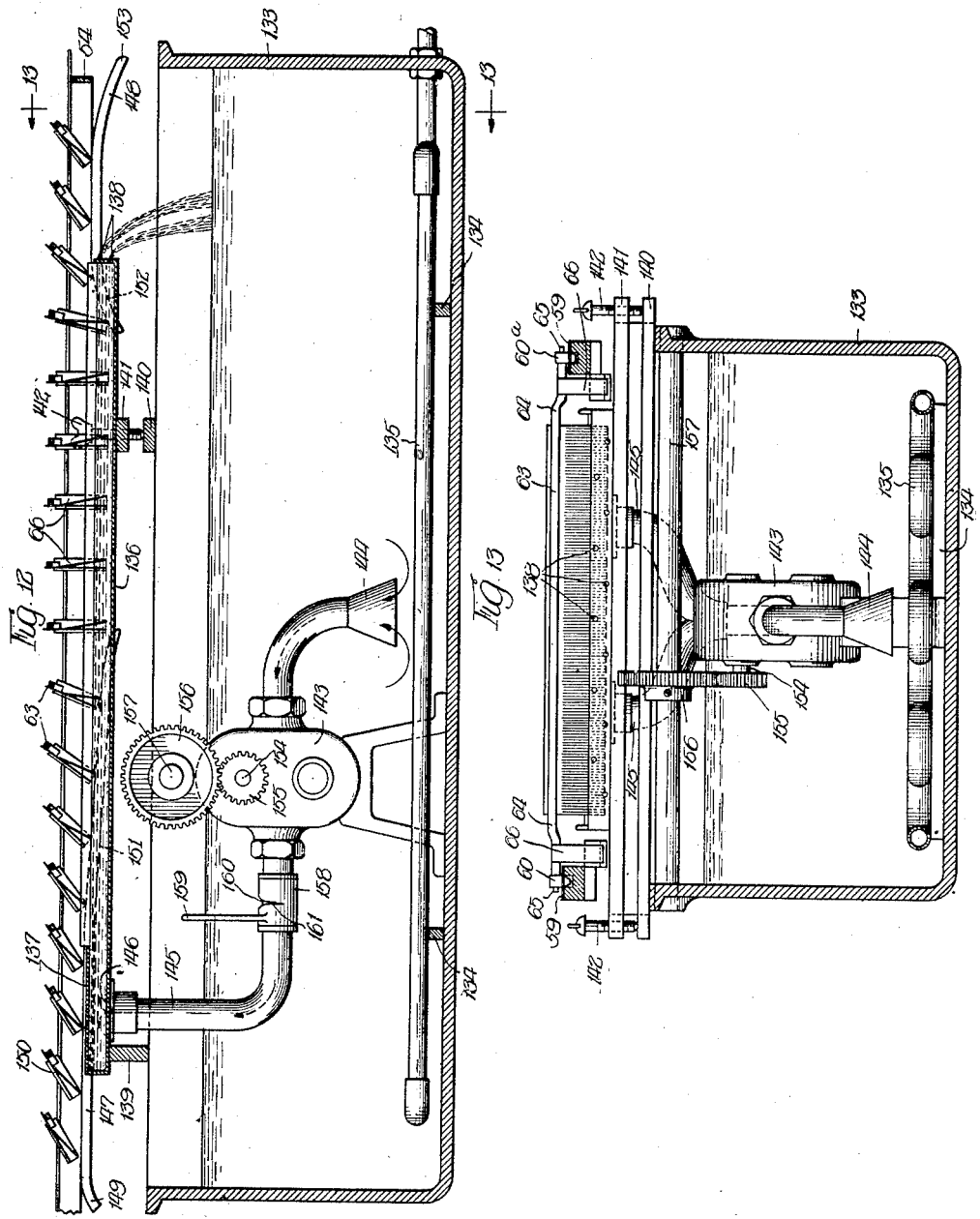

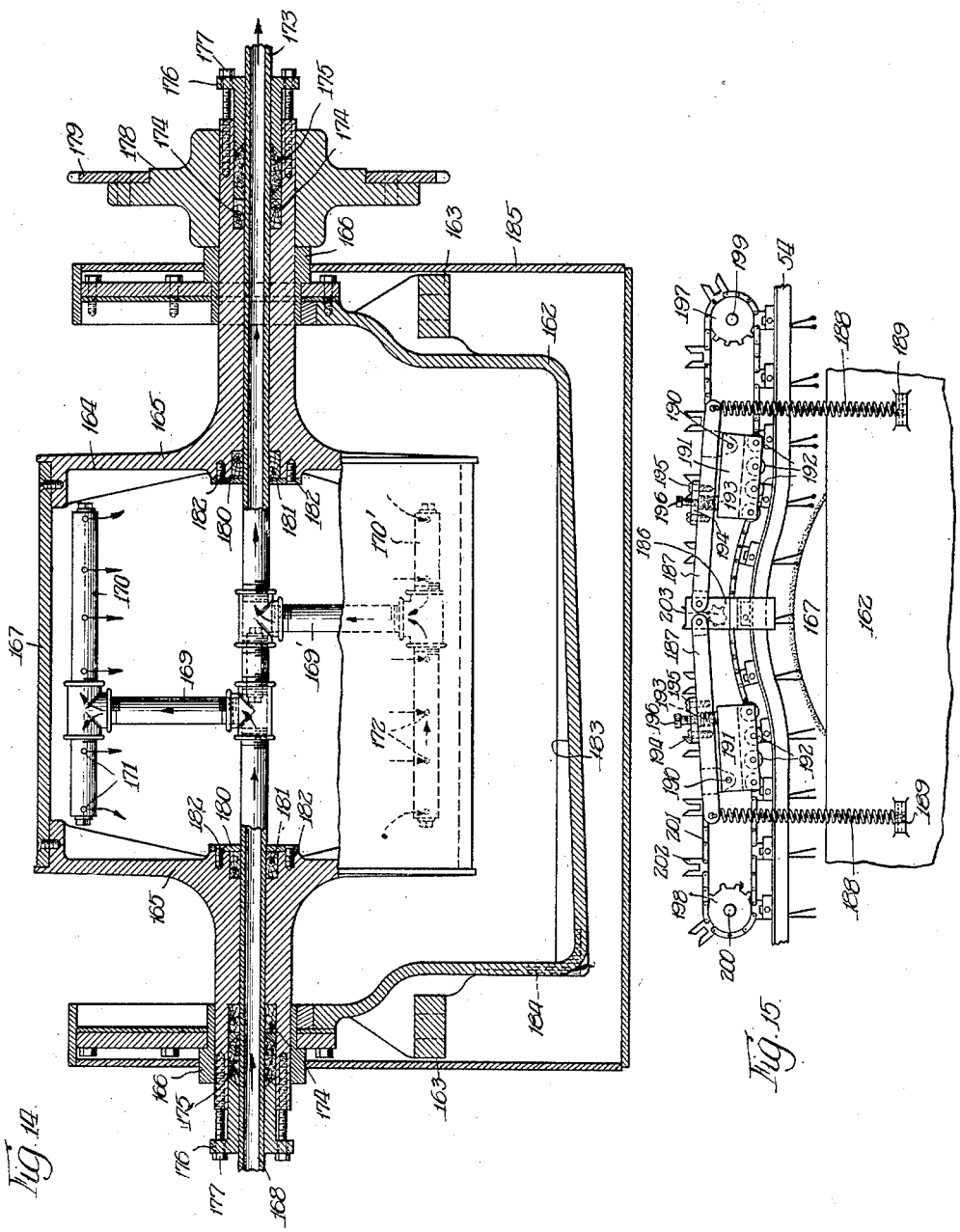

June 10, 1930.  C. N. NEKLUTIN  1,762,344
STRIP MACHINE
Filed Aug. 31, 1927   9 Sheets-Sheet 9
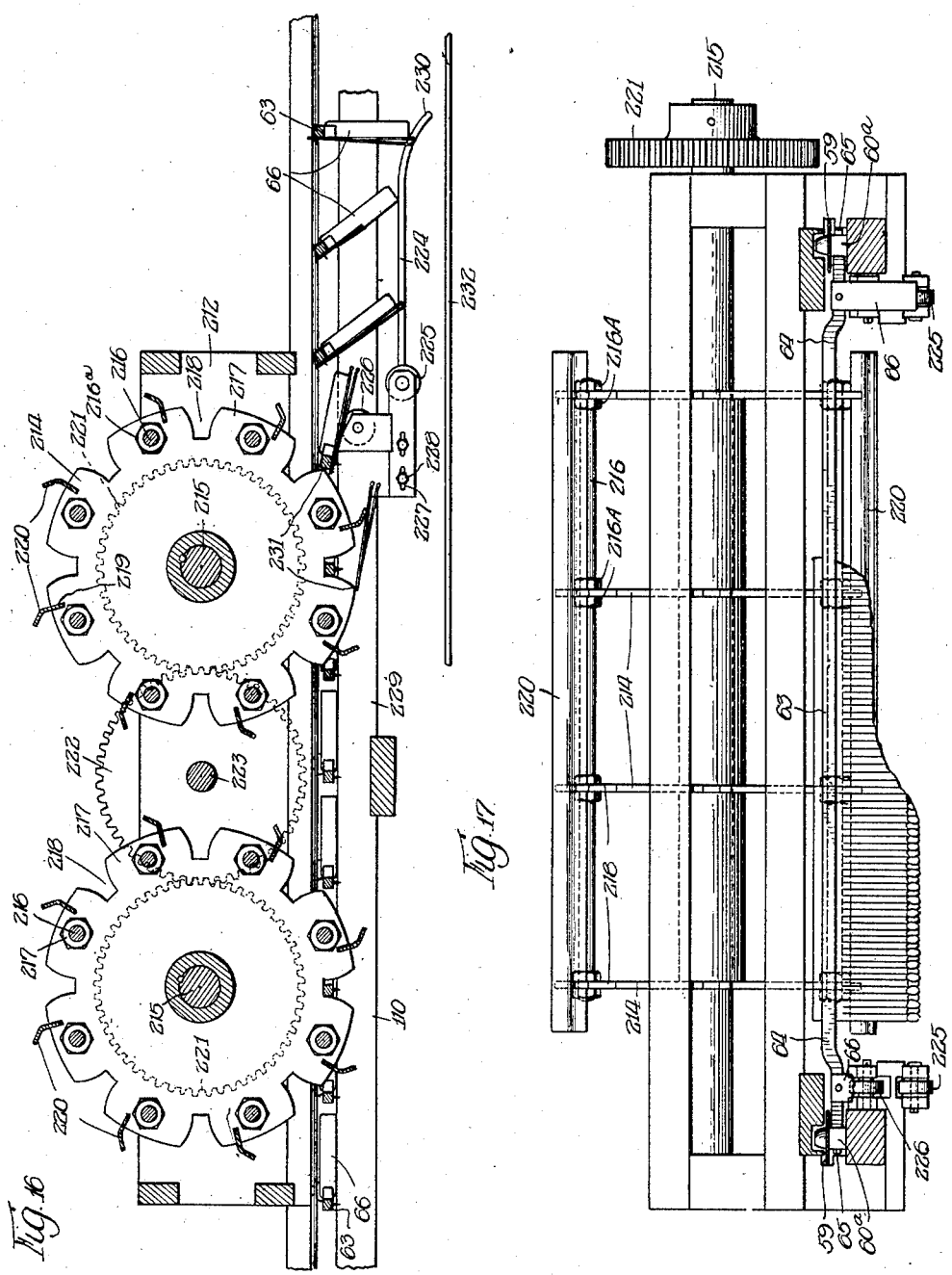
Witness:
R. Burkhardt
Inventor:
Constantine N. Neklutin,
By Wilkinson, Hulley, Byron & Knight
Attys.

Patented June 10, 1930

1,762,344

UNITED STATES PATENT OFFICE

CONSTANTINE N. NEKLUTIN, OF FERGUSON, MISSOURI, ASSIGNOR TO THE UNIVERSAL MATCH CORPORATION, OF ST. LOUIS, MISSOURI, A CORPORATION OF DELAWARE

STRIP MACHINE

Application filed August 31, 1927. Serial No. 216,587.

This invention relates to a machine for making cards of match splints of the type usually of paper which are wrapped in suitable covers and stapled to form what is known in the art as book matches. The machine is of the type employing continuous motion throughout for forming from a continuous strip of stock material, the finished cards of match splints each card being of a desired size and usually of a size equal to a plurality of individual cards used in making a single book whereby the machine may be of any size in width to make cards of any length and the capacity of the machine accordingly increased as desired.

My invention relates to a type of machine in which a continuous conveyor is employed for conveying the stock through the machine for forming the individual cards, the conveyor being employed in combination with continuously rotating slitting, cutting and spreading elements and means for applying the paraffin and ignition material to the ends of the cards and finally, means for ejecting the individual cards from the conveyor when they are in their completed form.

My invention is an improvement on the type of machine disclosed in the patent to Ferretti, No. 1,605,336, issued November 2, 1926, and also the type of machine disclosed in my co-pending application, Serial No. 161,294, filed Jan. 15, 1927.

It will be noted that these machines likewise employ a continuous feed of stock material through rotary cutters and also a continuously moving conveyor of a novel type for conveying the individual cards through additional mechanism which applies paraffin and ignition material thereto for forming the completed cards of match splints. The essential difference between the type of machine covered in the above identified patent and application and my present invention resides in the application of the strip of stock material to the conveyor prior to its passage through the rotary cutters and the conveyance of the strip material through the rotary cutters while attached to the conveyor so that each portion of the continuous strip which is applied to a carrier of the conveyor is subsequently cut from the strip and in a manner to form an individual card which remains fixed on its particular carrier and is conveyed further through the machine where it is acted upon by suitable mechanism for forming the completed cards and finally ejecting mechanism for removing the cards from the carriers of the conveyor.

My invention also differs in other structural improvements and details which provide for special features occasioned by the fact that the spacing of the carriers on the conveyor in my machine is exactly equal to the height of each individual match card being conveyed by virtue of the fact that the individual cards are cut from a continuous strip already applied to the conveyor.

Accordingly, one of the objects of my invention is to provide a machine employing continuously operating rotary cutters for forming the individual splints for match cards in combination with a continuously moving conveyor which receives a strip of stock material and subsequently passes with the stock material between the rotary cutters for forming a plurality of individual match splint cards therefrom.

Another object of my invention is to provide rollers which will perform the cutting operation and will be so constructed as to form the cards of match splints and will permit the passage of a conveyor carrying stock material to pass therebetween.

Another object of my invention is to provide a means for fixing the continuously fed strip of stock material to the continuously moving conveyor, whereby the carriers of the conveyor will engage and hold the strip at spaced intervals which will be subsequently cut apart to form individual match cards.

Another object of my invention is to provide a means whereby the feeding of the strip to the conveyor may be largely accomplished by the conveyor itself and for providing a guide for the strip which may be adjusted to permit the initial introduction and fixing of the strip on the conveyor manually when it is being first started.

Another object of my invention is to provide means in a machine of the above described type, where the conveyor is provided with swinging carriers and spaced apart an amount equal to the height of each individual card for causing the adjacent cards to swing past each other in passing through the machine and around the end pulleys of the conveyor.

Another object of my invention is to provide a new and improved means for applying paraffin to the ends of the match splints and also an improved means for applying the ignition material and finally to provide a novel type of ejector that works in a very desirable manner in connection with my machine.

It is a further object of my invention to provide in a machine of the above described type in which there is a combination of elements as set forth, suitable gearing mechanism for driving the various parts in their proper direction and at the proper speed to effect the desired operation and as will be hereinafter more fully described.

These and other objects are accomplished by means of the arrangement disclosed in the accompanying sheets of drawings, in which—

Figure 1 is a side elevation of one end of the machine, constructed in accordance with my invention, and Figure 1a is a similar view of a portion of my machine next adjacent to that shown in Figure 1 and continued at the right hand end of Figure 1; Figures 1 and 1a are to be placed end to end in disclosing the side elevation of the main portion of the machine;

Figure 2 is a plan view of Figure 1;

Figure 2a is a pan view of Figure 1a;

Figure 3 is a plan view of the feeding and trimming device for feeding the strip stock to the machine;

Figure 4 is a side elevation partly in cross section of the device shown in Figure 3;

Figure 9 is an end elevation partly in cross section taken on the line 9—9 of Figure 2, looking in the direction of the arrows, disclosing the spreading rolls and the surrounding mechanism;

Figure 10 is a view similar to Figures 5 and 6 taken on the line 10—10 of Figure 9 showing the spreading rolls with the conveyor and match cards passing therebetween;

Figure 5:
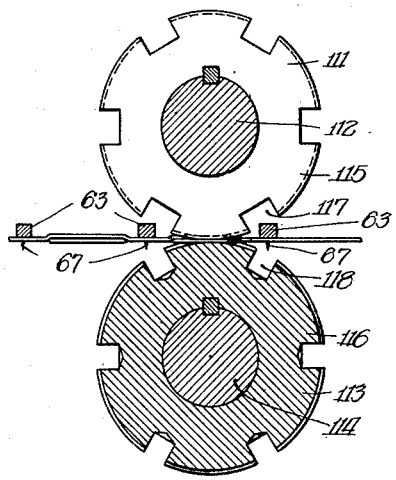
Figure 5 is a side elevation of the slitting rolls employed on my machine; this figure also discloses the manner in which the conveyor with the strip stock is passed between the rolls.

Figure 11 is a fragmentary view of the conveyor and the end pulley thereof disclosing the manner in which carriers and match cards are caused to swing past one another in passing around the end pulley. Attention is directed to the fact that the pulley shown at the left of Figure 11 is that disclosed at the left of Figure 1, and that the pulley at the right of Figure 11 is not shown in Figures 1 or 1a, but is positioned at the opposite end of the machine in any desired location at the end of a long conveyor where it is desired to reverse the direction of the conveyor and return it to its original starting point;

Figure 12 is a side elevation partly in cross section of the means constructed in accordance with my invention for applying paraffin to the ends of the cards of match splints;

Figure 13 is an end elevation in cross section taken on the line 13—13 of Figure 12 and looking in the direction of the arrows;

Figure 14 is an end elevation in cross section of the mechanism employed in my invention for applying the head ignition material to the ends of the match splints;

Figure 15 is a fragmentary side elevation of the mechanism shown in Figure 14 together with the construction of the conveyor guide and cooperating mechanism for effecting the application of ignition material to the ends of the match splints;

Figure 16 is a side elevation partly in cross section of the ejector for removing the completed match cards from the conveyor and constructed in accordance with my invention, and Figure 17 is an end elevation partly in cross section of the mechanism shown in Figure 16.

The various novel features of the invention will be apparent from the following description and drawings and will be particularly pointed out in the appended claims.

I will now give a general outline of the construction and operation of my machine. My machine comprises a long endless conveyor, one end of which is positioned in cooperation with cutting mechanism and mechanism for applying the paraffin and ignition material to the ends of match splints and the other end of the conveyor passing through a relatively long enclosure which may be of glass or other suitable means which enclosure constitutes a dryer. When the cards have been completely formed at the cutting end of the machine they pass to the drying end of the machine, the cards being introduced fixed to the carriers on the conveyor and enter the dryer when the head composition material is still wet, and they continue to pass therethrough for a substantial distance to the end where they pass around an end pulley and return to the cutting end of the machine where they encounter a cooperating ejector which is positioned and preferably adjacent the lower run of the conveyor, and at a point near the cutting means.

At the cutting end, the cutting rolls preferably cooperate with the conveyor and material thereon at the lower run of the conveyor, and immediately after the cards have been formed and the splints separated, the conveyor and carriers pass around the end pulley at the cutting end of the machine and conveyor, at which time they are caused by structural features to swing past each other and assume a position substantially transverse with the plane of the conveyor, and in a manner to present the exposed lower ends of the cards in such position that they cooperate the mechanism for applying paraffin and head ignition material thereto, these last two mechanisms being positioned to cooperate with the upper run of the conveyor belt and at a position just ahead of the entrance to the drying enclosure.

The supply of strip stock which is usually in the form of a roll is positioned under the machine and is fed upwardly and is fixed to the under side of the lower run of the conveyor at a location just ahead of the cutting mechanism. It will be understood from this that the machine comprises a continuously moving conveyor with swinging carriers and means for feeding a continuous strip of stock so that it will be introduced and fixed on the lower run of the conveyor at a point removed a distance from the end pulley thereof sufficient to accommodate the card forming rotary slitting, cutting and spreading mechanisms. The conveyor and material then pass through slitting, cutting and spreading rolls to form the cards of match splints, during which time the carriers and material lie in a plane parallel with the plane of the conveyor so that the conveyor and material thereon are comparatively flat during this portion of the travel. The conveyors carrying the cards are then passed around the left hand end pulley as seen in Figure 1, the conveyor moving clockwise and during a portion of the travel around this pulley the carriers and cards are caused to swing in a plane transverse to the conveyor with the ends of the splints projecting downwardly. The conveyor then brings the splints over the paraffin applying mechanism, and subsequently the head ignition material applying mechanism, after which the conveyor and the completed cards of match splints pass into an elongated dryer. The conveyor and cards continue to the end of the conveyor and then pass downwardly over the pulley at the dryer end of the machine, the pulley being so constructed as to permit only a single carrier to swing at a time whereby the adjacent cards will be prevented from touching one another so that they return on the lower run of the belt to the opposite end of the machine in a depending position through the length of the dryer and are presented to an ejector where the individual cards are removed from the carriers after the carriers have been swung in a plane parallel with the plane of the conveyor. The cards at this point fall onto a conveyor belt and are conveyed to a suitable location, and the conveyor itself returns to the point where the strip stock is introduced thereon and there receives new strip stock, whereby the operation is repeated. The feed and movement through the entire machine is continuous.

Referring to the drawing, particularly to Figures 1 and 1ª, and 2 and 2ª, it will be noted that my machine comprises a table mounted on legs 21 which table forms a support for the mechanism at one end of the machine. On the opposite surface of the table are four sets of spaced brackets 22, 23, 24 and 25 attached by a bolt or any other suitable means, and which provide in spaces therebetween means for receiving and retaining the three sets of bearings 26, 27 and 28 for the three sets of match splint card forming rolls. At the left hand end of the table 20 are upstanding spaced brackets 29 for receiving bearings in which are mounted the ends of shaft 30 for the conveyor and pulley 31ª. Positioned above the table 20 and fixed on the brackets 22, 25 and 29 is the slotted table plate 31 which forms a support for the conveyor and strip stock at this portion of the machine. At the right hand end of the table shown in Figure 1, and mounted on top of the brackets 25, are spaced elongated bars 32 which extend to the right and form supports on which the paraffin and ignition material applying mechanisms are mounted. The elongated bars 32 are supported on suitable legs 33 and 34 and at their extreme right hand ends connect with the adjacent end of the dryer which may continue in the same horizontal plane as that of the conveyor shown in Figures 1 and 1ª or may be deflected upwardly by suitable construction, and, pulleys for the conveyor, so that it may be hung from the ceiling so as to conserve space in a factory.

Figure 7:
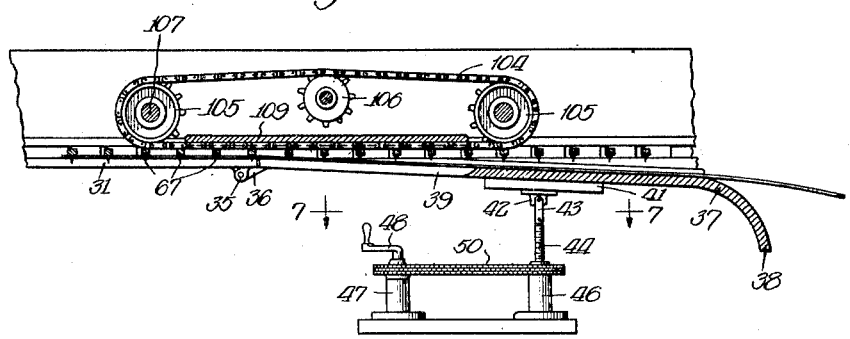
Figure 7 is a side elevation partly in cross section of the portion of my machine where the strip stock is brought in contact with and fixed to the continuously moving conveyor disclosing the adjustable guide plate and the means for exerting a pressure on the conveyor.
Figure 8:
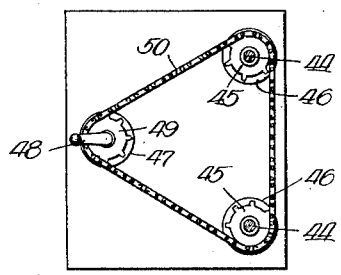
Figure 8 is a plan view partly in cross section of the mechanism for adjusting the guide plate shown in Figure 7, the showing being taken on the line 7—7 of Figure 7.

By referring to Figure 7, the slotted table 31 referred to it will be noted, terminates and is provided at its end with pivot lugs 35 which form a bearing for the pivot lugs 36 carried on the pivotal table extension 37. This extension slopes downwardly and is provided with a rounded lip 38 at its outer end. Midway its length, it is provided with slots 39 which are aligned and form continuous slots with the slots 40 in the table 31. On the underside of the pivotal table extension is a block 41 provided with pivot lugs 42 to which the links 43 are pivoted, the links being pivoted at their lower ends to the screw shafts 44 having a screw-threaded fit in the hubs of the gears 45. The gears 45 have a turning fit in the stands 46 mounted on the table 20 in such a manner that they are free ot rotate, but are held against vertical displacement. Also mounted on the table 20 in a stand 47 is the shaft and crank 48, having the gear 49 mounted thereon in the manner shown in Figure 7. Trained about the gears 45 and 49 is a flexible gearing element such as the chain 50 whereby when the crank 48 is rotating manually, the screw shafts 44 are caused to move vertically upwardly and downwardly according to the direction of rotation and to cause a corresponding movement of the table extension 37 around its pivot at the lugs 35 and 36. The purpose of this mechanism is to permit the introduction of the stock material on the conveyor when the machine is being started initially, and this specific manner of operation will be referred to in detail hereinafter. Positioned on top of the spaced brackets 23 are upstanding supports 51 on which are mounted the spaced guide tracks 52 for the upper run of the conveyor belt. The guide track for the lower run of the conveyor belt is positioned at the opposite edges of the slotted table 31, and is shown at 53 in Figure 1 and in Figure 9. The upper guide track 52 is provided with a groove 55 in its upper face. These grooves are provided to cooperate with the teeth carried on the inside of the flexible conveyor elements in a manner to hold the flexible conveyor against lateral displacement. By referring to Figure 1ª, it will be noted that additional brackets 51 are provided mounted on the supporting bars 32 for the purpose of holding the upper conveyor track in position. The conveyor pulley 31ª positioned at the right hand end of the machine as shown in the drawings comprises a pair of spaced wheels 56—56 fixed on the shaft 30 which shaft has fixed on its outer end a gear wheel 57.

Figure 6:
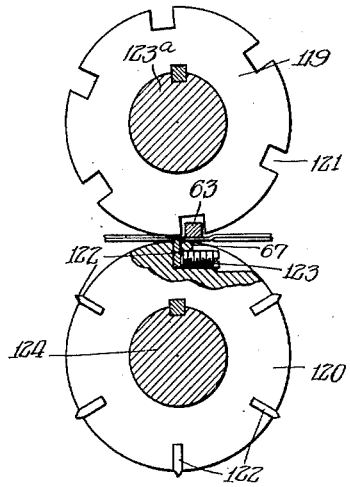
Figure 6 is a view similar to Figure 5 showing the transverse cutting rolls.

Referring to Figure 11, it will be noted that the conveyor pulley is provided with a plurality of teeth receiving openings 58 in its outer surface so as to function in the capacity of a sprocket cooperating with the teeth on the conveyor in a manner to drive the conveyor and hold it against movement relative to the pulley. The conveyor comprises a pair of spaced flexible steel ribbons or bands 59 trained about the pulleys 60—60 at the opposite end of the machine and any additional pulleys which are necessary in the event it is desired to deflect the course of travel of the conveyor belt in the machine, as for instance, in approaching and returning from the elevated dryer carried on the ceiling. On the outer face of the flexible bands 59 are a plurality of spaced lugs 60ª having bearing holes 61 provided in the inside lateral faces thereof, and on the underside of the flexible bands are the teeth elements 62 adapted to cooperate with the openings 58 of the pulley for effecting the sprocket drive. The lugs 60ª on the two spaced bands are in transverse alignment with one another so that the bearings provided may receive carrier bars 63 therebetween pivotally mounted in the bearings. By referring particularly to Figures 13 and 17, it will be noted that the construction of the carrier bars is somewhat modified from that described in the patent and copending application referred to and particularly in that the carried bar is offset as at 64 near their ends for the purpose of locating the pivot inwardly of the top and bottom edges of the cards when they are mounted thereon, or in other words, in a substantially central location of the body of the cards. This feature has a very distinct importance in connection with the operation of this machine and will be referred to more particularly hereinafter. The carriers 63 also comprise trunnions 65 positioned through the bearings in the lugs 60ª and have at their ends weighted arms 66, which, when permitted, act under the influence of gravity to give a bias to the arms to a position transverse to that of the plane of the conveyor and in a manner to present exposed depending edges of the match splint cards for the purpose of presenting them in a proper manner to be treated by the paraffin applying mechanism and the head ignition material applying mechanism. The carrier bars are provided on one face as shown in Figures 5, 6 and 7 with pins 67 preferably four in number, which penetrate the stock material and in this manner hold the material and the individual match splint cards removably fixed to the carriers so as to be conveyed by the carriers during the operation of the machine.

Referring to Figure 11, the return pulleys 60—60 corresponding with the pulleys 56—56 are substantially like the pulleys 56—56 with the exception that pins or lugs 68 are provided on the inner lateral faces thereof, in a manner to cooperate with the weighted arms 66 of the individual carriers. This pulley is likewise provided with openings 69 similar to the openings 58 for cooperation with the teeth 62 on the flexible conveyor bands. The pulley comprises spaced wheel elements similar to those shown in Figure 9, mounted on shaft 70, carried by a bracket suitably mounted at the far end of the machine. At the base of the pulley 60 an adjustable block 71 mounted on a base 72 and, adjustable by means of the screw 73 and lugs 74, is provided and so located beneath the point where the lower run of the conveyor leaves the sprocket that as the individual carriers fall free of the pins 68 by virtue of the rotation of the pulley 60, the weighted arms 66 will contact block 71 and be guided thereby into a depending position transverse to the plane of the conveyor and be arrested from any swinging movement due to inertia, created when the weighted arms are permitted to swing free of the pins. The purpose of permitting only one of the carriers to swing free at a time, will be plainly understood when it is considered that the spacing of the individual carriers one from another longitudinally of the conveyor is only equal to exactly the height of each individual card when cut from the continuous strip and that in view of this, the free swinging carriers with their depending cards when slightly lengthened by the addition of head ignition material would be unable to pass one another if permitted to depend free in their pivots in passing around the end pulley 60. This obstacle is overcome, however, by first providing the pivot for each individual carrier on an axis located a substantial distance inwardly of the upper and lower edges of the individual cards and secondly, by permitting the individual cards so pivoted to swing one at a time. In view of the fact that the pivot is located inwardly of the edges, one individual card swings into a position parallel with the plane of the conveyor while the adjacent cards on both sides remain transverse thereto, and will not contact the adjacent cards, in view of the fact that part of the single card lies on each side of the pivotal axis and will only partially bridge the space toward the next adjacent card on each side which is equal to an entire card width. Thus it can be seen that by means of the pins 68 which hold the individual carriers from falling under the influence of gravity to a depending position until they reach the point where the conveyor leaves the pulley 60 and then only permit one carrier to swing free at a time, that by this construction the cards even though slightly elongated by the presence of head friction material on the ends thereof will not contact adjacent cards, and will be permitted to travel around the pulley and assume a corresponding depending position substantially transverse to the plane of the conveyor belt. As shown in Figure 1ª, the roll of stock material 75 is mounted on a spindle 76 which is carried on lugs 77 positioned on an upright support 78 which also serve as supports for the upper conveyor bars 32. Also carried on the spindle 76 are a pair of radial blades 79 which act as side guides for the roll of stock during the time it is being unrolled and fed into the machine.

Referring now particularly to Figures 3 and 4, it will be noted that the strip of stock 80 from the roll 75 passes through a guide 81 where it engages a pair of feed rolls 82 and a rotary cutter trimming knife 83. This mechanism as shown in Figure 1ª, is mounted on the supporting stand or legs 33 and held on the cross plate 84 carried thereby. On the outer end of the cross plate is a reduction gear unit 85 receiving its driving power from a shaft 86 connected with a motor by suitable gearing elements to be hereinafter described. The reduction gearing unit may contain any type of gearing, but is preferably one employing a worm and worm gear not shown, housed within a casing and operated to drive in the proper direction and speed, the shaft 87. Mounted on the shaft 87 are a pair of feed rolls 82 which engage the upper surface of the sheet stock 80 and cooperate with lower feed rolls 82′ positioned to engage the lower surface of the sheet stock 80 so as to feed it in the manner shown in Figure 4. A gear 88 mounted on the shaft 87 cooperates with a similar gear mounted on a shaft 87′ for driving the lower roll. On the opposite end of the shaft 87 a sprocket 89 is provided, which with the flexible gear elements such as a sprocket chain, cooperates with the sprocket 91 to drive the shaft 92 and the rotary trimming knife 83. On the end of the shaft 92 is a gear 93 adapted to cooperate with a corresponding gear mounted on the shaft 92′ for driving a second rotary cutting knife 83′. The guide elements 81 comprises a lower plate 94, positioned at an angle and having a curved lower edge 95 adapted to receive the inwardly fed strip of stock. Positioned on top of the plate 94 and slightly spaced thereabove, is an upper guiding member comprising three plates 96 held by means of the cross bars 97 screwed or riveted thereto in any manner desired. The lower plate 94 has a pair of openings 98 therethrough in proper position to permit the lower feeding rolls 82′ to project therethrough in a manner to engage the lower surface of the strip stock. The upper feeding rolls 82 are positioned in the space provided between the spaced upper plates 96 constituting the upper guiding element. The guide 81 is of a width slightly in excess of the width of the strip stock contemplated for use on the particular machine, and is provided at one edge 99 with a straight contacting edge adapted to engage the edge 100 of the strip stock 80 to limit its movement in one direction, the stock 80 being forced in that direction by means of a leaf spring 101 positioned in the guide and engaging the opposite edge of the strip stock 80. This is for the purpose of assuring that the stock passes through the guide at all times in contact with the guiding edge 99. The upper plate 96 adjacent the rotary knives is cut away as at 102 to permit the rotary cutter 83 to contact the edge 103 of the strip stock 80. The lower guide plate 94 is cut away in a manner to permit the lower rotary cutter to extend through and cooperate with the upper cutter so that the edge 103 while being fed through the guide is trimmed in the event it is of irregular width, whereby stock material of an exact uniform width is always supplied to the machine. The rotary cutters are mounted for adjustment whereby the width may be varied in any manner desired.

Referring now particularly to Figure 7, it will be noted that the strip stock after passing from the feeding and guiding mechanism above described passes over the table extension or guide plate 37 in a manner to underlie and finally assume a plane parallel to the lower run of the conveyor. The feed rollers 82 and 82′ described in connection with the guide and trimmer, feed the stock through the guide and cause the same to be unrolled from the supply roll 75 and push it forward to the point where it is introduced onto the conveyor, but from this point on the conveyor supplies the feed and in fact causes the feeding of the stock from the guide rolls disclosed in Figures 3 and 4, due to the flexible nature of the strip stock, in that the feed rolls merely supply stock at the proper rate but are unable to push it into the machine. In view of this, in order to start the machine, it is necessary by manipulating the crank 48 shown in Figure 7 to lower the extension table 37 in a manner to permit the paper to be placed thereupon, the full length thereof, and to subsequently, raise the table by means of the crank 48 so that the leading edge of the strip stock is caused to be perforated by the depending pins 67 provided on the individual carriers. When in this position, the machine may be started, the pins penetrating the paper establishing sufficient gripping thereof to cause the continued feeding of the paper strip into the machine and into a position where the continuous feeding of the strip and converging of the strip and the conveyor causes the pins to successively perforate and grip the strip stock as it is presented. In order to provide means for backing the conveyor so that it will be held in place and be caused to perforate the strip stock as presented and to prevent the undue wear on the conveyor, my machine is provided with flexible chain elements 104, trained about sprockets 105 and 106. One of the sets of sprockets 105 acts as a driver, deriving its power from the shaft 107. I further provide a set of sprockets 106 which are adjustably mounted in the slots 108 as shown in Figure 1 to act in the capacity of a tightener therefor. There are preferably four chains of this type, each of which is positioned to engage and overlie the conveyor carriers immediately above each of the four series of pins, it being understood however, that any number may be provided according to the number of pins provided on each carrier and it also being understood that it is not necessary to have the chains directly overlie the pins, but merely to engage the carriers in a manner to exert sufficient pressure thereon to prevent them from displacing and to cause them to perforate the paper in the manner described. The lower run of the chains 104 are held against displacement by a stationary plate 109 which engages the upper surface thereof, and has a sliding bearing engagement therewith. This mechanism provides means for holding the conveyor against displacement by the stationary plate 109 without bringing the conveyor in contact therewith with relative sliding movement whereby undue wear on the conveyor is prevented. When the individual chains 104 wear, it is a relatively inexpensive matter to replace these and restore the machine to its normal operation.

Attention at this point is directed to the fact that the four pins on the conveyor carriers which project downwardly during the portion of their travel over, the table 31 and a portion of the table extension 37, project through the slots 40 provided to receive these, and that consequently, they may project through and hold the strip stock which is carried, fixed to the conveyor and resting on the table.

Referring now to Figures 9 and 17, in addition to the conveyor guides 53, the table is provided with a portion 110 which engages the depending weighted arms 66 and each individual carrier for causing them to assume during this portion of their travel, a plane substantially parallel with the plane of the conveyor, and as particularly shown in Figure 11 to remain in a position parallel with the conveyor during a portion of its travel around the end pulley 56.

After the strip stock is introduced onto the conveyor as above described, the conveyor and stock then pass between a pair of slitting rolls constructed as shown in Figure 5, which rolls are mounted in suitable bearings adjustably held between the upstanding brackets 24 and 25 mounted on the table and shown in Figure 1. These rolls may be of any desired configuration, but must be constructed in a manner to permit the conveyor with the strip stock to pass therebetween.

Referring to Figure 5, it will be noted that the upper roll 111 is mounted on a shaft 112, that the lower roll 113 is mounted on a shaft 114, both of the rolls being keyed to their respective shafts. The rolls are provided with segment portions 115 and 116 which cooperate with each other and are so positioned relative to the shaft, and the gearing connections for driving the shafts and the conveyor, that they cooperate with each other in a manner to slit the strip stock lying between adjacent carriers of the conveyor as shown in Figure 5. Between the segments 115 and 116 are openings 117 and 118 which are of such size and configuration and are so located on the cooperating rolls according to the gearing connections above referred to, that they receive the cross bars 63 constituting the carriers for the conveyor so that the conveyor may pass readily therebetween. The carriers are actually received in openings 117 in the roll 111 and the openings 118 receive the depending pins of the carriers. The cutting segments of the cooperating rolls comprise a series of ridges and grooves on each of the rolls, the grooves on one roll cooperating with the ridges on the other roll so that the stock when passing therebetween is slit longitudinally in a manner to form a transverse series of individual match splints, the individual ridges and grooves upon the rolls therefore being the width of the desired match splints. Accordingly, the portion of the continuous strip to which the carrier bar 63 is fixed remains uncut and constitutes a connecting portion for the individual splints in a manner to form comb-like cards after the cards are cut apart at the location where the splints terminate.

The conveyor and the slitted stock next pass between the pair of transverse cutting rolls 119 and 120 shown in Figure 6, one roll 119 of which is constructed with the pockets 121 in a manner similar to the pockets shown in roll 111 adapted to receive the carrier bar 63 of the conveyor. The lower roll 120 is provided with a plurality of transverse cutting blades 122 removably held by means of the screw 123 preferably in the manner shown. The roll 119 is keyed to the shaft 123ª and the lower roll is keyed to the shaft 124, the shafts being geared together and driven in a manner to cause the cutting blades to cooperate with one edge of the segment portion of the upper roll so as to cut the strip on a transverse line, and the driving of these rolls is synchronized with the driving of a conveyor in a manner to present a transverse cutting blade in cutting relation with the strip stock at a point where the slits forming the match splints terminate. In this manner comb-like cards are formed, each of which is mounted on a carrier bar 63 and spaced apart an amount exactly equal to the height of the individual match cards.

The cards so formed on the conveyor next pass between a pair of spreading rolls which are mounted on the bearings 26 positioned between the upstanding brackets 22 and 23 on the table.

Referring now particularly to Figure 10, it will be noted that the spreading rolls 125 and 126 are keyed to shafts 127 and 128 geared together and that the upper roll 125 is provided with transverse pockets 129 adapted to receive the transverse carrier bars 63 therebetween. The upper roll 125 has gear segment portions as shown in Figure 9, having a plurality of circumferential ridges and grooves of a width slightly larger than the width of the individual match splints and that the lower roll has a plurality of series of upstanding fingers 130 adapted to cooperate with the grooves on the segments of the upper roll, the fingers 130 being positioned so as to cooperate with alternate match splints of each individual card. The action of the fingers and cooperating grooves in engagement with alternate match splints is to displace alternate splints so as to render each individual splint spaced from every other splint, whereby when they are subsequently dipped and headed, they will not stick, one to the other. Attention at this point is directed to the fact that the shafts 127 and 128 are so geared relative to each other and in synchronism with the driving of the conveyor and the cutting rolls above described, that they exactly fit in engagement with alternate splints in a manner to displace them.

It is further important to note the particular advantage in the operation of this machine at this point in that the fixing of the strip stock to the conveyor prior to the transverse cutting action for forming individual cards holds each card accurately in the same relation as cut when subsequently presented to the spreading mechanism. The value of this will be appreciated when it is understood that when cards are longitudinally slit in a manner to form match splints and are subsequently transversely cut in a manner to form the match splint cards of comb-like formation and with cut splint ends at one edge exposed that therefore, a spreading action occurs, whereby a relatively long card will assume a substantially curved shape with the greater circumference at the free cut ends of the splints. This action renders it extremely difficult to pass the cards so formed through a spreading mechanism as the splints move out of registration with the fingers. In view of the fact that the cards are held on each conveyor carrier at the time it is slit, and cut and in the held position is presented to the spreading mechanism, an accurate registration of the parts for effecting this operation is assured. The series of fingers 130 on the roll 126 are removably held in position by means of the screws 131, it being understood that the fingers may be constructed as a plurality of individual blades held in position, but is preferably made in the form of a block having grooves in its outer face to form the individual fingers.

The table 31 which forms the support for the strip of stock is cut away as at 132 shown in Figure 10, at the location between each of the three sets of rolls shown in Figures 5, 6 and 10 so that the upper and lower rolls may cooperate with each other to perform the proper cutting and spreading action on the match splint material conveyed therebetween.

Referring now particularly to Figure 11, after the cards are completely formed and prepared for the subsequent treatment with paraffin and head ignition material, they then pass around the end pulley 56. By means of the guide bars 110 which engage the weighted arms 66 on the carriers, the carriers are held in such manner that the individual cards assume positions substantially tangential to the periphery of the pulley for the first 90° of travel around the pulley. In this position, the individual carriers and cards are brought to a substantially vertical position and from this point on for the remaining 90° of travel around the pulley they are permitted to remain vertically disposed or in other words to swing under the influence of gravity one inside of the other so that when they reach the upper run they travel in a depending relationship disposed substantially transverse to the plane of the conveyor. Although, the spacing between adjacent carriers is only equal to the height of an individual card, the adjacent edges of adjacent cards are free to swing clear of each other in this operation by virtue of the fact that they are disposed on the outside of the conveyor which, on account of the fact that the carrier arms have a substantial thickness, causes them to travel on a circumference larger than the circumference on which the conveyor travels and consequently, the adjacent edges of adjacent cards are spaced one from the other. This spacing though slight, is sufficient to permit the cards to swing free of each other and to assume a position under the influence of gravity substantially transverse to the plane of the conveyor.

Referring now to Figures 1ª and 2ª and 12 and 13, it will be noted that the depending cards as carried on the upper run of the conveyor next pass over the mechanism for coating the exposed match splint ends with hot paraffin. The paraffin applying device comprises a tank 133 of sufficient size which is mounted on and supported by the frame bar members 32 and the main weight of which is taken on the leg stand 33 which is positioned immediately under the tank. Positioned in the bottom of the tank, resting on sills 134 is a steam heating coil 135 which is supplied with steam from some suitable source not shown, and is for the purpose of maintaining paraffin contained in the tank in a heated and in liquid condition. Mounted above the tank and in a position intersecting the path of the depending ends of the match cards is a trough element 136 having four walls and an overhanging cover plate 137 at one end and a plurality of openings 138 in the wall at the opposite end. The inlet end is supported on a suitable support 139, the opposite end being adjustably mounted for vertical movement on the support 140 by means of the brace bar 141 and the wing bolt 142. The support on the bar 139 is by means of pivots not shown, so that by adjusting the wing bolt 142 the trough may be moved vertically so as to cause exposed match splint ends to be dipped into the liquid the desired amount so as to change the angle of the trough, whereby it regulates the speed of flow of the liquid by varying the incline.

Positioned in the tank is a suitable pump 143 which may be of any type such as a gear pump of the type shown having an inlet 144 positioned to intake liquid paraffin from the tank 133 and an outlet 145 which conveys the pump liquid to the inlet opening at 146 at the left hand end of the trough. Attention is directed to the fact that the inlet end of the trough is the end at which the approaching conveyor carriers and cards enter the trough and in view of the fact that the outlet is at the opposite end a flow of liquid paraffin is established which by proper regulation of the pump operation and incline of the trough is substantially equal to that of the speed of travel of the cards, and also that the outlet openings are of such a size and so positioned that they cooperate to maintain this flow at proper speed and to establish the depth of liquid paraffin in the trough at the elevation suitable for effecting the proper dipping of the match splint ends. In order to vary the openings 138 plugs may be inserted as desired. Positioned adjacent the conveyor tracks 54 at the portion which overlies the trough are guide bars 147 positioned at the inlet end of the trough and guide bars 148 at the outlet end. The guide bars 147 have their leading edges curved downwardly as at 149 so as to properly engage the weighted arms 66 of the individual carriers and to cause them to assume an angular position as shown at 150 in Figure 12 so that the depending ends of the cards will be lifted an amount sufficient to clear the leading end wall of the trough. The guide bars then extend downwardly as at 151 to permit the carriers to again assume their vertical positions and to present the card ends submerged in the moving liquid and to travel therein for a substantial distance during which time, by virtue of the flow of the liquid there is substantially no relative movement between the liquid paraffin and the ends of the match cards. On approaching the opposite ends of the trough the weighted arms 66 engage the curved ends 152 of the guide bars 148 so that the cards are again deflected to an angular position and lifted over the end wall and pass out of the trough. The guide bars 148 terminate with curved ends as at 153 to permit the arms to assume a depending position in which position they are properly presented to the mechanism for applying the head ignition material. The pump 143 referred to, is provided with a shaft 154 on which is mounted a gear 155 meshed with a second gear 156. The gear 156 is fixed to the shaft 157 which shaft is driven by suitable gearing elements from the source of power to be hereinafter described. In order to regulate the amount of paraffin which will be pumped to the upper trough, a collar 158 is positioned on the outlet pipe 145 which collar is mounted for rotation and has a handle 159 and a V-shaped opening 160 adapted to register with an opening 161 provided in the pipe 145. By means of this collar which may be rotated to present a greater or less amount of opening by means of the V-shaped opening 160, a greater or less amount of paraffin may be allowed to escape through the opening back into the tank which will accordingly influence the amount of paraffin that is pumped to the upper level in the trough. It is possible by means of this sleeve to cut off the opening 161 entirely so that all of the liquid pumped will be raised to the elevated trough. The match splint cards in their depending position next pass over and cooperate with the head ignition applying mechanism and by referring particularly to Figures 1a and 2a, it will be noted that this mechanism comprises a tank 162 supported by means of legs 163 on the frame bars 32 and that the weight of the mechanism is taken on the leg stand 34 which directly underlies the tank. It is to be understood that the head ignition applying mechanism is spaced from the paraffin mechanism a distance sufficient to permit the coated splints to cool and the paraffin to harden by exposure to the atmosphere or by special means provided for this purpose, as for instance, a current of air.

Referring now particularly to Figures 14 and 15 it will be noted that the main friction head material applying roll is relatively large and presents an increased cylindrical surface in contact with the match splint ends. The roll 164 comprises end members 165 journaled in bearing members 166 mounted in openings in the side of the tank and has a cylindrical surface 167 carried by the side flange bearing portions. Positioned through one of the hubs 165 of the side flange members is a pipe 168 connected by means of a hot water tight rotary connection with a source of hot water not shown, for the purpose of conveying, by means of the pipe connections 169 and 170, 169' and 170', hot water, enters the drum through the openings 171 and leaves the drum through openings 172, through the drum and out through the pipe 173. In the middle of the drum between the pipes 168 and 173 is a connecting plug which makes a mechanical support for the pipe ends, but prevents the water from passing therethrough. Packing glands are provided at the hub portions surrounding the pipe and comprise the rings 174, packing material 175 and the gland element 176 held to the hub by means of the bolts 177. Fixed to one end of the hub is a sprocket gear comprising a hub portion 178 and a tooth ring 179 which is suitably connected for rotating the drum at the proper speed and direction. On the inside of the drum surrounding the pipes 168 and 173 are rings 180, washers 181 held in place by the screws 182. Attention is directed to the fact that the bottom 183 of the tank 162 slopes to one side and also toward the mid-point in the opposite direction so as to effect the proper draining and an opening 184 which is adapted to be closed by a plug is provided at the low point for effecting the drain when it is desired to empty the tank. The tank 162 is preferably encased in a housing 185 made of asbestos or other material so that the entire tank of head composition material will not cool when heated. The head ignition composition may be heated by means of steam coils similar to those in the paraffin tank or by any other suitable means not shown in the drawing. With this combination of heating means whereby hot water is introduced into the roller as well as providing for heating and maintaining the tank of material hot, a more desirably and uniform temperature can be maintained whereby the material remains at the desired uniform consistency without the necessity of employing excessive and dangerous heat. This is an important feature in view of the fact that the material being heated is inflammable.

Referring now particularly to Figures 1a and 16, it will be noted that the conveyor track 54 is deflected immediately above the roller in an arcuate path which is concentric with the periphery of the roller and that the conveyor with its individual carriers are caused in traveling over this portion to assume a path concentric with the periphery of the roller and in a manner to present the ends of the match splints in contact with the surface of the roller and embedded in the thin layer of head ignition material carried thereon, and to dwell in their submerged positions for a short period during which time there is substantially no relative movement between the ends of the match cards and the material carried on the roller by virtue of the fact that the roller is driven so that its surface travels at the same rate of speed as the ends of the match splints. In order to maintain the conveyor in contact with the guide track so that it will conform to the curve thereof. a pair of spring pressed roller members are positioned on opposite sides of the arcuate portions in engagement with the upper surface of the conveyor. These elements are pivoted to a pair of center brackets 186 carried by the guide track 54 and comprise a pair of arms 187 having their outer ends connected by tension springs 188 to lugs 189 mounted on the side of the tank. Each of the arms 187 has a pivot bracket 190 on which is pivoted spring pressed roller carrying members 191 having a plurality of rollers 192 bearing on the upper surface of the conveyor. The carrying elements are spring pressed at their ends opposite the pivot by means of the coil spring 193 mounted in an opening in the arm and adjustably mounted by means of the plate 194, screws 195 and the screw bolt 196. This mechanism operates to maintain the conveyor in intimate contact with the track and to present the match card ends in contact with the periphery of the roller.

In order to prevent the individual carriers from swinging at this portion of the travel of the conveyor, a holding device is provided which comprises a pair of sprockets 197 and 198 mounted on shafts 199 and 200. Trained about these sprockets is a flexible gear element such as a chain 201 having certain of its links constructed with holding arms as shown in 202 which are adapted to engage each individual carrier to hold it against swinging movement. The chain is provided with a sprocket 203 adjustably mounted so as to act in the capacity of a tightener whereby the chain 201 is maintained tight at all times to cause it to function properly as a holder for the carriers. The length of the chain is so adjusted as to permit the lower run to be deflected upwardly so as to conform to the arcuate path of travel of the conveyor at the portion overlying the friction head material applying drum. The shaft 200 serves as a driving means for the holding chain and is connected with a suitable source of power by gearing to be hereinafter described, the drive being such that the chain is driven at the same rate of speed as the conveyor and the lower run thereof in the same direction as the conveyor.

In addition to the friction head material applying drum, this mechanism is also provided with two smaller drums 204 and 205 as shown in Figures 1ª and 2ª. These drums are suitably journaled in the sides of the tank 162 and are positioned so that their upper surfaces are below the upper surfaces of the larger drum and will just contact tangentially the ends of the coated match splints so as to serve as smoothing rollers. These rollers are mounted on shafts 206 and 207 respectively and are driven by means of a sprocket on the shaft 207 and the flexible gear element 208 which meshes with a second sprocket on the shaft 209. The shaft 209 is driven from a suitable source of power by proper gearing elements to be hereinafter described. By means of the flexible gearing elements such as a chain 210 and additional sprockets mounted on the shafts 206 and 207, the shaft 206 is driven from the shaft 207. The main drum and its sprocket 179 are driven from the shaft 209 by means of an additional sprocket fixed to the shaft 209 and a flexible gear element such as a chain 211 connecting these sprockets.

After the match cards have been completed with their heads of ignition material, they pass through an elongated dryer as above described which may be encased with glass or other suitable material, to the end of the machine where they return through the dryer by means of passing around the pulley 60 as shown in Figure 11. In view of the elongated nature of the individual splints by the presence of the head material in addition to the length of the match cards, the match cards with the special provision as by means of the pin 68 and the lug 71 associated with the pulley 60, are able to pass one another in a manner to return on the under run of the conveyor belt in a substantially transverse position to the plane of the conveyor, and as illustrated, each carrier is held by the pins 68 in a position approaching a radial line of the pulley 60 and permitted to swing free one at a time successively at the point where the conveyor leaves the pulley. The carriers continue in their depending position through the dryer along the lower run of the belt until they approach the ejecting mechanism disclosed in Figure 16.

The ejecting mechanism comprises a box-like frame 212 held by suitable supports 213 from the supporting bars 32 and positioned in closely associated relation with the conveyor as shown in Figure 1ª.

Referring now particularly to Figures 16 and 17, it will be noted that the ejectors are two in number and in view of the fact that they are similar in structure, the description of one will suffice for both. The ejectors are of the rotary type and each comprises a plurality, the number illustrated being four, gear like disc members 214 keyed to a shaft 215 and held in spaced relation by means of a plurality of transverse bolts 216 and the lock nuts 216A which are positioned on the threaded shafts in close engagement with the opposite faces of each disc. The gear like disc members are provided with tooth portions 217 and cut outs 218. Slots 219 are provided in each tooth in which is mounted a transverse angular blade 220 which is adapted to contact a portion of the match card in the ejecting operation. As shown in Figure 17 the shaft 215 has mounted thereon a gear 221 which is meshed with an idler gear 222 carried on the shaft 223 journaled in the frame boxing 212 which gear serves to connect the two ejecting members so that one will be driven by the other. The gear like rotary ejectors are constructed in the form of gears, for the purpose of being driven by the carriers on the conveyor which cooperate with the teeth on the ejectors, in addition to serving well in their action as ejectors. The drive is accomplished in the same manner as a rack cooperates with a meshing gear. In view of the fact that the carriers are readily removable and in some instances the machine may be operated with an individual carrier removed therefrom, it is desirable to provide two ejectors geared to each other for the purpose of maintaining at all times a driving relationship between the conveyor and the ejectors even though a particular carrier is missing. In the event a particular carrier is missing when this portion of the conveyor is presented to one of the rotary ejectors, the other rotary ejector geared thereto will be in mesh with certain of the carriers which will assure at all times that the driving relationship is maintained. Adjacent this portion of the conveyor I have provided associated with the conveyor track, and underlying the conveyor, a guide bar 224 and a plurality of rollers 225 and 226. The roller 225 is adjustably mounted by the slotted bracket 227 and the bolts 228 on the frame member 229 which is, as shown in Figure 1, a track bar on which the lower run of the conveyor rests. The upper roller 226 is also mounted in a bracket carried by the bar 229. The leading end of the guide bar 224 is bent downwardly as at 230 and is positioned together with the rollers 225 and 226 in a manner to successively contact and deflect the weighted arms 66 of the carriers, whereby they are presented to the ejector in a horizontal position. In view of the fact that it is only possible to maintain one individual carrier in a horizontal position at a time due to the spacing of the carriers relative to the height of each individual card, it is necessary to present only one carrier at a time to the ejector and to effect a complete removal of the card presented prior to the movement of the next successive card into a horizontal position. The ejector is designed to function in this manner, and by means of the rollers 225 and 226, each carrier is quickly swung into its horizontal position and immediately presented to the ejector whereby the card is removed before the next carrier is moved into position. The guide bar 224 is merely for the purpose of giving initially an angular position to each carrier to eliminate excessive impact between the rollers and the carriers. Such impact is detrimental for the reason that it tends to swing the carriers past the horizontal position. As the cards are presented in a horizontal position to the ejector, the corner edge 231 of each tooth of the gear like disc member contacts the portion of the card which extends past the carrier bar at the leading side or at the base of the card and immediately upon making this contact the continued movement of the ejector and conveyor effects a removal of the card from the holding pin which at this portion of the travel is extended downwardly. During this operation however, in order to prevent a bending of the match cards, the transverse blade 220 comes into contact with the portion of the card on the opposite side of the conveyor, and exerts a downward pressure to aid in the removal of the cards from the pins. This operation is disclosed in Figure 16. The second rotary ejector, in the event the first ejector functions properly merely aids in driving the first ejector but also serves to eject any match splint cards which have not been completely removed by the first ejector.

Referring to Figure 16 and particularly to Figure 1ª, it will be noted that a conveyor belt 232 is provided in a position to underlie the ejector in a manner to receive the ejected cards as they fall free from the conveyor. The conveyor belt 232 is trained about a pulley 233 at one end, which pulley is mounted on a shaft 234 carried in a bracket 235 mounted on the leg stand 34, the shaft 234 being suitably driven by means of a gear 236 connected with a source of power in a manner to be hereinafter described. The leg stand 34 is also provided with a slotted bracket 237 in which the shaft 238 is adjustably mounted carrying the idler belt tightener pulley 239. This last pulley provides means for maintaining the conveyor belt 232 tight at all times. On the under side of the conveyor track portion 229 there is a pair of brackets 240 in which are mounted idler pulleys 241 which act in the capacity of roller supports for the conveyor belt 232 at that portion underlying the ejectors. The opposite end of the conveyor belt 232 is not shown, but it merely passes to a location where the completed cards are accessible to an operator who removes them for subsequent treatment.

Referring now particularly to Figure 2, the means for driving the machine is preferably a motor 242 connected by means of a belt 243 and clutch mechanism 244 to the gear 245, the gear 245 being in mesh with a second gear 246 which drives the shaft 247 entering the reduction gear box 248. The shaft 247 in addition extends through the gear box and is coupled by means of shaft couplings 249 to drive a series of gear boxes 250, 251 and 252. The gear box 248 is constructed to drive in the proper direction and rate of speed, the shaft 253, on which is mounted a gear 254 meshed with a second gear 255, the second gear being fixed to the shaft 30 on which is mounted the end pulley 31ª for the end of the conveyor. This gearing connection serves to drive the conveyor in the proper direction and rate of speed. The gear box 250 drives the shaft 256 which is connected by a coupling 257 to the shaft 127 which is the shaft carrying the upper roll of the spreading mechanism. The gearing box 251 drives the shaft 258 which is connected by means of a coupling 259 to the shaft 123 which carries the upper roll of the transverse cutting mechanism. The gearing box 252 drives the shaft 260 which is connected by means of the coupling 261 to the shaft 112 which carries the upper roll of the slitting mechanism. The main shaft 247 continues on and connects by means of the coupling 262 to the shaft 263, the shaft being mounted in suitable bearing 264 carried on the frame structure. A bracket 265 is likewise mounted on a frame and is provided with bearings in which the shaft 266 is mounted, which shaft is connected to be driven by means of the beveled gears 267 and 268 from the shaft 263 and in turn, by means of beveled gears 269 and 270 to drive the shaft 271. The shaft 271, referring now particularly to Figure 1ª, is journaled in the brackets 272 mounted on the frame structure and serves to drive the paraffin applying mechanism by means of the beveled gears 273 and 274 and also the head ignition material applying mechanism by means of the beveled gear 275 fixed to the end of the shaft in mesh with the beveled gear 276 fixed to the end of the shaft 209, the shaft 209 being journaled in brackets 277 mounted on the frame structure.

For the purpose of driving the conveyor belt 232, an additional shaft 278 is provided journaled in brackets 279 and 280 which is driven from the shaft 271 by means of the beveled gears 281 and 282, the shaft 278 in turn being connected by means of the beveled gear 283 which meshes with the beveled gear 236 fixed to the shaft 234.

For the purpose of driving the holding chain which cooperates with the conveyor above the head ignition material applying mechanism, I provide a shaft 284 suitably journaled to the frame which has a beveled gear at its lower end not shown, in mesh with the beveled gear 281. The upper end of the shaft 284 has fixed thereto a beveled gear 285 which meshes with a second beveled gear 286 fixed to the shaft 200 on which is mounted the sprockets for driving the holding chains.

Referring now to Figures 1, 2, and 1ª, it will be noted that the end of the shaft 263 is connected by means of the universal coupling 287 with the shaft 288 which in turn is connected by means of a second universal coupling 289 to the shaft 286 which drives the reduction gear unit 85 shown in Figures 1ª and 3.

The clutch mechanism 244 for starting the machine is manually controllable by means of the lever 290 which will set the entire machine into and out of operation. It will be understood that other gearing connections may be made to effect the operation of the machine, but that those illustrated and described are found to serve well.

For the purpose of driving the pressing chains overlying the conveyor at the point where the strip stock is introduced, a sprocket chain 291 is provided connecting the shaft 127 with the shaft 107 by means of suitable sprockets 292 and 293 fixed respectively to these shafts.

In practice, the operation of the machine is as follows: A roll 75 of strip stock material is mounted on the machine and the leading edge is fed between the guide and feed rolls shown in Figure 4, where the strip is urged in one direction by the spring 101 in a manner to cause the trimming rolls 83 and 83' to trim the edge thereof. At the starting of the machine the table extension 37 shown in Figure 7 is lowered and the stock is placed thereon the full length, and the table extension is raised by means of the crank 48 to cause the leading edge of the stock to be perforated by the pins on the conveyor and to be fixed thereto. The clutch handle 290 is then thrown into gear, whereby the machine is started in operation.

The conveyor pulls the stock through the machine and passes it successively between the slitting roll shown in Figure 5, the transverse cutting roll shown in Figure 6 and the spreading roll shown in Figure 10. The conveyor continues with the cards formed around the end pulley 56, and are held in a position parallel to the plane of the conveyor by means of the guide bar 110 for a portion of their travel around the pulley, but are thereafter permitted to swing freely inwardly to assume positions transverse to the plane of the conveyor at the upper run. This is permitted as above described by virtue of the fact that the cards travel on a larger circumference by means of being spaced from the periphery of the pulley so that the ends of the adjacent cards are spaced so as to clear one another.

As the conveyor advances in its continuous movement, the depending carriers and cards next pass over the paraffin applying mechanism shown in Figure 12, where the weighted arms first engage the guide bar 149 so as to be deflected to an angular position in their travel a sufficient extent to clear the end wall of the upper trough 136. The guide bar then deflects downwardly to cause the carriers to again assume a vertical position, in which position they dip into the trough of paraffin where the flow is regulated to be substantially equal to the speed of the cards whereby substantially no relative movement occurs between the paraffin and the cards. On leaving the trough the weighted arms again engage a guide bar 148 so as to be deflected over the wall at the opposite end of the trough.

Being in a depending position again, the carriers next pass over and cooperate with the head ignition material applying device as shown in Figure 15 where they travel in an arcuate path over an enlarged drum coated with a layer of predetermined thickness of ignition head material. Due to the fact that the cards travel in a path concentric with the surface of the drum, they are caused to dwell in a submerged condition during their continuous movement through the machine. This is very desirable for the reason that it is the most advantageous method to apply head material to introduce the match ends into the material in a direction of motion substantially perpendicular to the surface and to permit the match ends to remain so placed for a sufficient period to allow the rather viscous material to flow around the match ends and fill up the holes caused by the introduction of the ends of the splints. This manner of dipping is very well accomplished by means of the device described in my invention. During this operation the carriers are held against swinging movement by the holding chain 201 positioned above the conveyor. The conveyor is held to conform to the arcuate track by means of the spring pressed devices contacting its upper surface.

From this point the depending carriers and cards pass through an elongated dryer not shown, which merely comprises a casing of suitable nature which may be of glass, through which an extension of the conveyor runs to one end and returns leaving the casing at the same end at which it enters. At the far end of the drying casing the cards even though with their head material are slightly longer than the space between the carriers, are caused to pass around the pulley and to swing past each other by means of the type of pulley shown at the right hand side of Figure 11 and also by means of the type of carriers provided which are pivoted on the flexible bands of the conveyor in such a manner that the cards swing on axis located substantially inwardly of their longitudinal edges. The cards as shown are held by means of pins 68 in a position immovable relative to the pulley until they reach the point at which they leave the pulley at which time one carrier at a time swings to a transverse position. The adjusting plug 71 regulates the manner in which the cards swing free from the pins.

As above mentioned after passing around the pulley, the depending carriers and cards on the lower run pass again through the full length of the drying casing and approach, after passing therefrom the opposite end of the machine where they encounter an extractor as shown in Figure 16. Here by means of the guide bar 224 and rollers 225 and 226, one card and carrier at a time is swung into a position parallel with the plane of the conveyor, and are successfully engaged by the rotary extractor, each card being extracted by virtue of the construction of the mechanism before the next following card is presented to the parallel position. I provide two extractors which are geared together and each of which is driven by the conveyor so that in the event, one carrier is missing, the continuity of the rotary drive of the extractors is maintained. From this point, the conveyors are maintained in a parallel position relative to the plane of the conveyor on the guide bar 229. in which position they approach the point where the additional strip stock is introduced thereon and the entire operation is repeated.

Attention is directed to the conveyor belt 232 underlying the extractors which catches the individual cards in their completed form and conveys them to a location where they may be conveniently removed. The relative speed of the main conveyor and the conveyor belt 232 determines the manner in which the cards are deposited on the belt 232 which may be in overlapped relation which presents them in a manner where large quantities of them are more easily handled and removed.

In the claims where I refer to "match splint cards", I mean cards of strip material of a size sufficient to form individual cards for a plurality of match books, completely formed as far as the splints are concerned, but without paraffin or head material applied thereto, and where I refer to "cards of match splints", I refer to the cards having the paraffin and head material applied to the ends of the splints.

I claim:

1. In a machine for making match splint cards, the combination of a conveyor and cutting means for forming individual cards of match splints and means for feeding a continuous strip of material, and means for fixing said strip to said conveyor at spaced intervals, said conveyor and strip material passing through said cutting means.

2. The process of making cards of match splints which consists in fixing a continuously advancing strip of material to a conveyor, advancing said conveyor continuously and a constant speed throughout its entire path of travel, and subsequently cutting, dipping and coating said material to form finished cards of match splints while traveling with and fixed to said conveyor.

3. In a machine for making cards of match splints, the combination of an endless conveyor having means for engaging and conveying material from one location in the path of travel of said conveyor to a second location in the path of travel of said conveyor, cutting, dipping and coating means independently operated and positioned adjacent the path of travel of said conveyor, between said first and second location and in a manner to operate upon said conveyed material to form completed cards of match splints therefrom and ejecting means operated by said conveyor positioned at said second location in the path of travel of said conveyor.

4. In a machine for making cards of match splints, the combination of an endless conveyor having means for engaging and conveying material from one location in its path of travel to a second location in its path of travel, cutting, dipping, and coating means positioned adjacent the path of travel of said conveyor between said first and second locations and in a manner to operate upon said conveyor material to form completed cards of match splints therefrom, and ejecting means associated with said conveyor, located at said second location in the path of travel of said conveyor, operating to eject the completed cards of match splints.

5. In a machine for making cards of match splints, a conveyor having a plurality of individual holding means thereon, means for bringing said conveyor and a strip of material in close parallel relation and for fixing said strip of material on said holding means, means acting on spaced portions of said strip of material located between said holding means to form therefrom a plurality of individual match splint cards, and means for moving said individual holding means and splint cards into planes substantially transverse to the plane of said conveyor.

6. In a machine for making cards of match splints, the combination of a conveyor and shaping rolls for forming match splint cards means for fixing a continuous strip of material to said conveyor, at spaced intervals and for passing said conveyor and strip between said shaping rolls, said shaping rolls having portions for acting on said strip and recessed portions, said rolls acting on the strip between the points of fixation to said conveyor and said recessed portions receiving the portions of said conveyor fixed to said strip.

7. In a machine for making match splint cards, the combination of a conveyor, and cutting rolls, means on said conveyor at spaced intervals throughout its length adapted to hold a strip of stock, means for fixing a strip of stock on said holding means, said conveyor and holding means positively advancing said strip through said cutting rolls and holding said strip against deformation during its advance through said cutting rolls, whereby said strip is accurately positioned with relation to said cutting rolls for forming match splint cards.

8. In a machine for making match splint cards, the combination of a conveyor having holding means at spaced intervals throughout its length, and a pair of slitting rolls constructed to slit portions of strip stock at spaced intervals along its length to form a plurality of transversely extending series of longitudinally disposed splints, and means for fixing a strip of stock to said holding means and for causing said conveyor and stock to pass between said slitting rolls.

9. In a machine for making match splint cards, the combination of a conveyor having holding means at spaced intervals throughout its length, and a pair of slitting rolls constructed to slit portions of strip stock at spaced intervals along its length to form a plurality of transversely extending series of longitudinally disposed splints, and means for fixing a strip of stock to said holding means and for causing said conveyor and stock to pass between said slitting rolls, said slitting rolls slitting the portions of said stock lying between said holding means.

10. In a machine for making match splint cards, the combination of a conveyor having holding means at spaced intervals throughout its length and a pair of cutting rolls constructed to cut strip stock transversely at spaced intervals, and means for fixing a strip of stock to said holding means and for causing said conveyor and stock to pass between said slitting rolls.

11. In a machine for making match splint cards, the combination of a conveyor having holding means at spaced intervals throughout its length and a pair of cutting rolls, constructed to cut strip stock transversely at spaced intervals, and means for fixing a strip of stock to said holding means and for causing said conveyor and stock to pass between said slitting rolls, said cutting rolls cutting said stock transversely at a point lying between said holding means.

12. In a machine for making match splint cards, the combination of a conveyor having holding means at spaced intervals throughout its length, and a pair of slitting rolls constructed to slit portions of strip stock at spaced intervals along its length to form a plurality of transversely extending series of longitudinally disposed splints, a pair of cutting rolls constructed to cut said strip stock transversely at points where said series of splints terminate, and means for fixing a strip of stock to said holding means and for causing said conveyor and stock to pass between said slitting and cutting rolls, whereby match splint cards are formed.

13. In a machine for making match splint cards, the combination of a conveyor having holding means at spaced intervals throughout its length, rolls for acting on a strip of stock for forming match splint cards therefrom, and a pair of rolls for displacing alternate splints of said match cards, and means for fixing a strip of stock to said holding means and for causing said conveyor and stock to pass between said last mentioned pair of rolls.

14. In a machine for making match splint cards, the combination of a conveyor moving in a predetermined direction, a guideway having an end portion disposed at an angle to the path of travel of said conveyor and a second portion parallel with the path of travel of said conveyor, all arranged to accommodate a strip of stock positioned so as to advance along said guideway in a manner to approach said conveyor and travel therewith, means on said conveyor for engaging said stock when it approaches a parallel relationship relative thereto, whereby said stock is caused to be engaged and carried by said conveyor, said guideway being pivotally mounted and adjustable whereby the strip of stock may be initially caused to be engaged by said conveyor by manual operation.

15. In a machine for making match splint cards, the combination of a conveyor moving in a predetermined direction, a guideway having an end portion disposed at an angle to the path of travel of said conveyor and a second portion parallel with the path of travel of said conveyor, all arranged to accommodate a strip of stock positioned so as to advance along said guideway in a manner to approach said conveyor, and travel therewith, means on said conveyor for engaging said stock when it approaches a parallel relationship relative thereto, whereby said stock is caused to be engaged and carried by said conveyor solely by its approaching movement, said conveyor having backing means for resisting displacement thereof at the location of engagement with said stock.

16. In a machine for making match splint cards, the combination of a conveyor having a plurality of match splint cards carried thereby, and a pair of rolls for spacing alternate match splints of said cards, said conveyor and cards passing between said pair of rolls, one of said rolls having recesses in its surface and the other of said rolls having projections on its surface, said match splint cards being carried on the side of said conveyor adjacent the last named roll, whereby the conveyor aids in resisting movement of said cards in a direction of the displacement of said alternate splints.

17. In a machine for making match splint cards, the combination of a conveyor having swinging carriers mounted thereon, and spaced apart a distance equal to the height of the individual match splint cards, means for maintaining said carriers in the plane of the conveyor during a portion of its travel, each carrier having a card mounted thereon, and means for causing each card to swing away from the edge of the next adjacent card and to assume a position substantially transverse to the plane of the conveyor, said last named means causing the individual cards to be positioned on a greater circumference than the conveyor in passing around a pulley, whereby the ends of adjacent cards will become spaced one from the other.

18. In a machine for making match splints, the combination of a pulley and a conveyor passing around said pulley, and also approaching and traveling away from said pulley in tangential paths thereto, said conveyor having carriers on its outer surface, each having a match splint card carried thereby, said carriers being so spaced and disposed that the edges of adjacent cards are in substantial contacting relation when approaching said pulley, means for maintaining said carriers and cards in the same plane as said conveyor for a portion of its travel, and for permitting each carrier and card to swing to a position substantially transverse to said conveyor when traveling around a portion of said pulley.

19. In a machine for making match splints, the combination of a pulley and a conveyor passing around said pulley, and also approaching and traveling away from said pulley in tangential paths thereto, said conveyor having carriers on its outer surface, each having a match splint card carried thereby, said carriers being so spaced and disposed that the edges of adjacent cards are in substantial contacting relation when approaching said pulley, means for maintaining said carriers and cards in the same plane as said conveyor for a portion of its travel, and for permitting each carrier and card to swing to a position substantially transverse to said conveyor when traveling around a portion of said pulley said carriers being of such dimension that the cards travel when passing around said pulley on a circumference sufficiently greater than the circumference traveled by said conveyor, that the ends of adjacent cards become spaced, so as to clear each other in assuming their transverse positions.

20. In a machine for making cards of match splints, the combination of a conveyor having a plurality of swinging carriers mounted thereon, match splint cards mounted on said carriers having exposed ends, an elongated container the end walls of which extend above the path of the exposed ends of said cards, and means for maintaining a flow of liquid in said container at a level above the path of said exposed ends and means contacting said carriers for swinging the carriers and cards successively into a path whereby the exposed ends will pass over the end walls in entering and leaving said container and to assume their original positions when passing over said container of liquid, whereby the exposed ends of said cards are dipped to a predetermined extent into said liquid during continuous movement.

21. In a machine for making cards of match splints, the combination of a conveyor having a plurality of swinging carriers mounted thereon, match splint cards mounted on said carriers having exposed ends, an elongated container the end walls of which extend above the path of the exposed ends of said cards, and means for maintaining a flow of liquid in said container at a level above the path of said exposed ends and means contacting said carriers for swinging the carriers and cards successively into a path whereby, the exposed ends will pass over the end walls in entering and leaving said container and to assume their original positions when passing over said container of liquid, whereby the exposed ends of said cards are dipped to a predetermined extent into said liquid during continuous movement, said flow being in the same direction and at the same rate as the movement of said cards, whereby substantially no relative movement between said exposed card ends and liquid takes place during the dipping action.

22. In a machine for making cards of match splints, the combination of a conveyor having a plurality of swinging carriers mounted thereon, said carriers being adapted to carry match splint cards and means for dipping the ends of said cards in a liquid, comprising a tank and a trough mounted above said tank, said trough and tank being positioned beneath said conveyor in such position as to cause the ends of said cards to extend into said trough while passing thereover, a pump in said tank connected to said trough, and liquid in said tank, whereby a continuous flow of liquid is maintained in said trough at a predetermined height, and means for swinging said carriers for causing said match splint cards to enter and leave said trough.

23. In a machine for making cards of match splints, the combination of a conveyor having a plurality of swinging carriers mounted thereon, said carriers being adapted to carry match splint cards and means for dipping the ends of said cards in a liquid, comprising a tank and a trough mounted above said tank, said trough and tank being positioned beneath said conveyor in such position as to cause the ends of said cards to extend into said trough while passing thereover, a pump in said tank connected to said trough, and liquid in said tank, whereby a continuous flow of liquid is maintained in said trough at a predetermined height, said trough being adjustably mounted, and means for swinging said carriers for causing said match splint cards to enter and leave said trough.

24. In a machine for making cards of match splints, the combination of a conveyor having a plurality of swinging carriers mounted thereon, said carriers being adapted to carry match splint cards, and means for dipping the ends of said cards in a liquid, comprising a tank and a trough mounted above said tank, said trough and tank being positioned beneath said conveyor in such position as to cause the ends of said cards to extend into said trough while passing thereover, a pump in said tank connected to said trough, and liquid in said tank, whereby a continuous flow of liquid is maintained in said trough at a predetermined height, and means for causing said swinging carriers to swing whereby they will pass over the wall of said trough on entering, dip the ends of said cards into said liquid, and pass over the opposite wall of said trough on leaving.

25. In a machine for making cards of match splints, the combination of a conveyor having a plurality of swinging carriers mounted thereon, said carriers being adapted to carry match splint cards and means for dipping the ends of said cards in a liquid, comprising a tank and a trough mounted above said tank, said trough and tank being positioned beneath said conveyor in such position as to cause the ends of said cards to extend into said trough while passing thereover, a pump in said tank connected to said trough and liquid in said tank, whereby a continuous flow of liquid is maintained in said trough at a predetermined height, and a heating unit on said tank for maintaining the liquid at a raised temperature, and means for swinging said carriers for causing said match splint cards to enter and leave said trough.

26. In a machine for making cards of match splints, the combination of a conveyor having a plurality of swinging carriers mounted thereon, said carriers being adapted to carry match splint cards, and means for dipping the ends of said cards in a liquid, comprising a tank, and a trough mounted above said tank, said trough and tank being positioned beneath said conveyor in such position as to cause the ends of said cards to extend into said trough while passing thereover, a pump in said tank connected to said trough, and liquid in said tank, whereby a continuous flow of liquid is maintained in said trough at a predetermined height, said pump being connected to said trough at the entering end, the opposite end having outlets for returning the liquid to said tank, and means for swinging said carriers for causing said match splint cards to enter and leave said trough.

27. In a machine for making cards of match splints, means for applying head ignition material thereto comprising the combination of means for conveying a plurality of match cards having exposed ends, a relatively large rotating drum having a layer of predetermined thickness of head ignition material thereon, and positioned to intersect the path of said card ends, said conveyor at the portion of its travel adjacent said drum traveling in a path which is the arc of a circle having the axis of the drum as its center.

28. In a machine for making cards of match splints, means for applying head ignition material thereto comprising the combination of means for conveying a plurality of match cards having exposed ends, a tank containing head ignition material, a drum rotating in said tank, having its lower surface extending below the surface of said material, and having its upper surface positioned to contact the exposed ends of said match splint cards, said conveyor means conveying said cards when passing over said drum in a path which is the arc of a circle having the axis of the drum as its center.

29. In a machine for making cards of match splints, means for applying head ignition material thereto comprising the combination of means for conveying a plurality of match cards having exposed ends, a tank containing head ignition material, a drum rotating in said tank, having its lower surface extending below the surface of said material, and having its upper surface positioned to contact the exposed ends of said match splint cards, said conveyor means conveying said cards when passing over said drum in a path which is the arc of a circle having the axis of the drum as its center, and means for determining the thickness of the layer of material on said drum.

30. In a machine for making cards of match splints, means for applying head ignition material thereto, comprising the combination of means for conveying a plurality of match cards having exposed ends, a tank containing head ignition material, a drum rotating in said tank, having its lower surface extending below the surface of said material, and having its upper surface positioned to contact the exposed ends of said match splint cards, said conveyor means conveying said cards when passing over said drum in a path which is the arc of a circle having the axis of the drum as its center, and means for smoothing the heads formed on said match splint cards.

31. In a machine for making cards of match splints, means for applying head ignition material thereto, comprising the combination of means for conveying a plurality of match cards having exposed ends, a tank containing head ignition material, a drum rotating in said tank, having its lower surface extending below the surface of said material, and having its upper surface positioned to contact the exposed ends of said match splint cards, said conveyor means conveying said cards when passing over said drum in a path which is the arc of a circle having the axis of the drum as its center, and a smoothing roll mounted in said drum adapted to contact the heads of said match splint cards for removing any excess of material thereon.

32. In a machine for making cards of match splints, means for applying head ignition material thereto, comprising the combination of means for conveying a plurality of match cards having exposed ends, a tank containing head ignition material, a drum rotating in said tank, having its lower surface extending below the surface of said material and having its upper surface positioned to contact the exposed ends of said match splint cards, said conveyor means conveying said cards when passing over said drum in a path which is the arc of a circle having the axis of the drum as its center, said drum having means for circulating a hot fluid through the interior thereof.

33. In a machine for making cards of match splints, a conveyor having swinging carriers, each of said carriers having a match splint card carried thereby, with their ends exposed, a surface having a layer of head ignition material thereon moving in contact with the exposed ends of said match cards during a portion of the travel of said cards and means coacting with said carriers for preventing them from swinging during the portion of their travel when they are in contact with said surface, said last named means comprising traveling carrier holding devices constructed to embrace each carrier from front and rear.

34. In a machine for making cards of match splints, the combination of a conveyor constructed to convey a plurality of match splint cards, a pair of rotary ejectors for said cards driven by said conveyor, said ejectors being geared together.

35. In a machine for making cards of match splints, an ejector comprising a rotary gear shaped element adapted to mesh with the carriers of a conveyor and be driven thereby having portions for engaging match splint cards carried by the carriers of the conveyor for removing them from the conveyor, said portions of the ejector contacting space portions of the cards, located on opposite sides of the carrier holding the particular card.

36. In a machine for making cards of match splints, an ejector comprising a rotary gear shaped element adapted to mesh with the carriers of a conveyor and be driven thereby having portions for engaging match splint cards carried by the carriers of the conveyor for removing them from the conveyor, said ejectors having one edge of its teeth adapted to contact the edge of a particular card located on one side of the carriers of said conveyor, and a blade projecting therefrom for contacting a portion of said card on the opposite side of said carriers.

37. In a machine for making cards of match splints, the combination of a conveyor having swinging carriers each with a match splint card carried thereon, a rotary ejector cooperating with said conveyor, the swinging carriers and cards being normally disposed transverse to the plane of said conveyor and means for moving one carrier and card at a time to a plane parallel with the plane of said conveyor at a point immediately ahead of said ejector, and to present the cards so disposed to said ejector, said ejector being constructed to eject each card so presented before the next following card is moved to a position parallel with the plane of said conveyor.

Signed at St. Louis, Missouri, this 24th day of August, 1927.

CONSTANTINE N. NEKLUTIN.